United States Patent [19]

Hamano et al.

[11] Patent Number: 4,464,595
[45] Date of Patent: Aug. 7, 1984

[54] FIELD SYSTEM OF MAGNET TYPE D.C. MOTOR HAVING MAGNETIC FLUX REDUCING POLE PIECES

[75] Inventors: Isao Hamano; Toshinori Tanaka, both of Himeji, Japan

[73] Assignee: Mitsubishi Denki Kabushiki Kaisha, Japan

[21] Appl. No.: 451,344

[22] Filed: Dec. 20, 1982

[30] Foreign Application Priority Data

Dec. 22, 1981 [JP] Japan .................. 56-192293[U]

[51] Int. Cl.³ .................. F16L 55/07; H02K 21/06
[52] U.S. Cl. .................. 310/154; 29/515; 29/596; 72/325; 310/42
[58] Field of Search .................. 29/469.5, 596, 515, 29/522; 72/370, 325, 326; 310/40 MM, 42, 89, 154, 254, 259

[56] References Cited

U.S. PATENT DOCUMENTS

| | | | |
|---|---|---|---|
| 2,903,610 | 9/1959 | Bessiere | 310/254 |
| 3,110,079 | 11/1963 | Wilson et al. | 72/325 |
| 3,497,735 | 2/1970 | Diedrichs et al. | 310/42 |
| 4,364,406 | 12/1982 | Bohlin | 72/325 |

FOREIGN PATENT DOCUMENTS

| | | | |
|---|---|---|---|
| 2269229 | 4/1974 | France | 310/154 |
| 1118604 | 7/1968 | United Kingdom | 310/154 |

Primary Examiner—J. D. Miller
Assistant Examiner—D. L. Rebsch
Attorney, Agent, or Firm—Leydig, Voit, Osann, Mayer & Holt, Ltd.

[57] ABSTRACT

In a field system of a magnet type D.C. motor constructed of a cylindrical yoke and a plurality of pole pieces, each of which is made of a permanent magnet member bonded to the inner peripheral surface of the yoke, an improved field system wherein each pole piece is formed with a recess along its central part. The yoke is provided with bent portions protruding inwards of the yoke, in correspondence with each recess, and the bent portions are held in engagement with the recess through an elastic member.

4 Claims, 4 Drawing Figures

FIELD SYSTEM OF MAGNET TYPE D.C. MOTOR HAVING MAGNETIC FLUX REDUCING POLE PIECES

BACKGROUND OF THE INVENTION

This invention relates to the field system of a magnet type D.C. motor such as an engine starting motor.

A prior-art field system of a magnet type D.C. motor has been as shown in FIG. 1. The figure illustrates one pole of the field system. Reference numeral 1 indicates the field assembly, namely, field system of the D.C. motor. The field system 1 comprises a cylindrical yoke 2 which is fabricated by press-working a soft steel plate, and a pole piece 3 which is made of a permanent magnet member such as a sintered ferrite compact that is bonded to the inner peripheral surface of the yoke 2 with a thermosetting resin, e.g., epoxy resin.

In operation, when an armature (not shown) arranged in the vicinity of the inner peripheral surfaces of such pole pieces 3 of the field system 1 is energized by a power supply (not shown), the armature is rotated by the magnetic field of the pole pieces 3. A reaction force due to the rotation develops in each pole piece 3, and it is transmitted to and received by the yoke 2.

The prior-art field system of the magnet type D.C. motor as described above has had the disadvantage that a magnetic flux produced at the energization of the armature interlinks with the field system 1, especially the yoke 2 of low magnetic reluctance, to exert an adverse influence on the magnetic characteristics of the field system 1. In addition, a high degree of bonding technique has been required for reliably bonding the pole piece 3 to a predetermined position of the yoke 2.

SUMMARY OF THE INVENTION

This invention has for its object to provide a field system of a magnet type D.C. motor wherein each pole piece is formed with a recess along the central part thereof in a manner to extend in the axial direction of a yoke, to cut off by the recess a magnetic flux generated upon the energization of an armature, whereby the above-stated disadvantage of the prior art attributed to the magnetic flux can be eliminated, and wherein the pole piece can be reliably fastened to a predetermined position of the yoke with ease.

BRIEF DESCRIPTION OF THE DRAWINGS

In the drawings, the same symbols indicate the same parts.

DESCRIPTION OF THE PREFERRED EMBODIMENT

Figure 1:
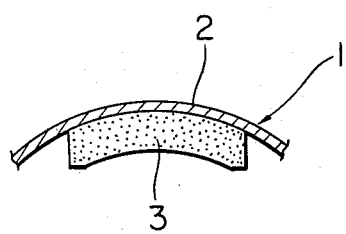
FIG. 1 is a sectional front view, partly broken away, showing a prior-art field system of a magnet type D.C. motor.
Figure 2:
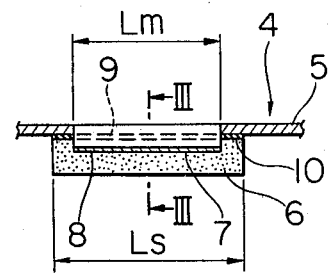
FIG. 2 is a sectional side view, partly broken away, showing a field system of a magnet type D.C. motor according to the present invention.
Figure 3:
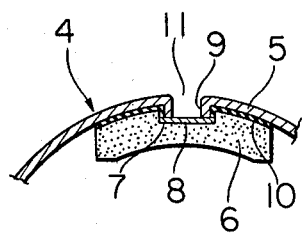
FIG. 3 is a sectional view taken along line III—III in FIG. 2.
Figure 4:
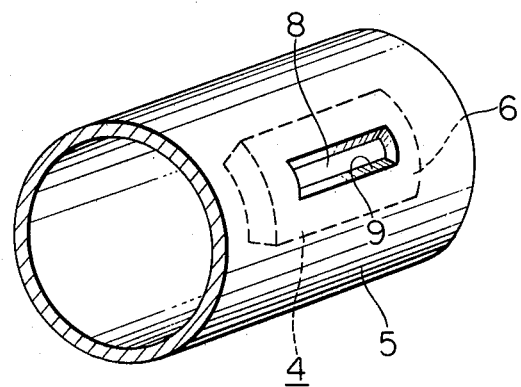
FIG. 4 is a perspective view for explaining the mounted state of the field system shown in FIGS. 2 and 3.

FIGS. 2, 3 and 4 illustrate one magnetic pole of a magnet type D.C. motor, in which numeral 4 indicates a field system. The field system 4 is principally constructed of a cylindrical yoke 5 which is fabricated by press-working a soft steel plate, and a pole piece 6 which is made of a ferrite permanent magnet member bonded and fixed to the inner peripheral surface of the yoke 5 and which has an axial length $L_s$. Since the central part of the circular arc of the pole piece 6 is less influenced by the reaction of an armature than the end parts of the circular arc, the thickness of the permanent magnet member in the radial direction of the yoke can be made smaller in the central part of the circular arc than in the end parts thereof. Therefore, the pole piece 6 is formed with a recess 7 of axial length $L_m$ along the central part of the magnetic pole, extending short of the axial end parts of the pole piece 6. The recess 7 is open to the outer peripheral surface of the pole piece 6. In addition, the yoke 5 is formed with a pair of bent portions 9 protruding toward the center of the yoke, in a position corresponding to the recess 7. The bent portions 9 are fastened in engagement with the side wall surfaces of the recess 7 through a cushion 8 which is made of an elastic material such as rubber, and the pole piece 6 is positioned with respect to the axial direction and peripheral direction of the yoke 5. Reference numeral 10 designates adhesives which bond the yoke 5 and pole piece 6. Reference numeral 11 designates a slit which is defined by providing the bent portions 9 in the yoke 5, and which has the function of cutting off a demagnetizing magnetic flux produced by the reaction of the armature (not shown). Since the construction of the D.C. motor other than the field system according to this embodiment is the same as in conventional D.C. motors, it shall be omitted from the illustration and description.

With the D.C. motor of this embodiment constructed as described above, the demagnetizing magnetic flux is cut off by the slit 11 of the yoke 5 and the recess 7 of the pole piece 6, so that the magnetic characteristics are enhanced. Moreover, the bent portions 9 of the yoke 5 are fastened in engagement with the side wall surfaces of the recess 7, to restrain the movements of the pole piece 6 in the axial and peripheral directions of the yoke 5, and to position the pole piece 6 so that the pole piece 6 is reliably fixed to the yoke 5, and the reliability of the bonding of the pole piece 6 is enhanced. Furthermore, the axial length of each bent portion 9 of the yoke 5 is made smaller than the length of the pole piece 6, and the water-proof cushion 8 is disposed between the recess 7 of the pole piece 6 and the bent portions 9, so that the assemblage of the field system 4 is facilitated, and high functions of preventing external moisture and dust are attained.

In this invention, the length of the bent portion of the yoke may be made greater than the length of the pole piece in the axial direction of the yoke so as to perform the positioning of the pole piece in the peripheral direction of the yoke.

As set forth above, according to this invention, a pole piece is formed with a recess along the central part thereof in a manner to extend in the axial direction of a yoke. This has the effect that the demagnetizing magnetic flux of an armature can be cut off by the recess, to improve magnetic characteristics. Another effect is that the reliability of the bonding between the pole piece and the yoke can be enhanced by the recess.

What is claimed is:

1. A field system of a magnet type D.C. motor comprising:
   a cylindrical yoke, a plurality of pole pieces each of which is made of a permanent magnet member bonded to an inner peripheral surface of said yoke, each pole piece having a recess formed therein which extends along a central part thereof, and a plurality of pairs of bent portions provided in said yoke each pair of bent portions in correspondence with each of said recess, and which are protruded inwards of said yoke and held in engagement with both side wall surfaces of said recess through an elastic member.

2. The field system according to claim 1, wherein said recess extends in the axial direction of said cylindrical yoke.

3. The field system according to claim 1, wherein each of said pairs of bent portions defines a slit in said cylindrical yoke.

4. The field system according to claim 1, wherein each elastic member comprises a cushion fastened between each pole piece and a corresponding pair of protruding bent portions of said yoke.

* * * * *